United States Patent
Lee et al.

(10) Patent No.: US 9,812,076 B2
(45) Date of Patent: Nov. 7, 2017

(54) LIQUID CRYSTAL DISPLAY

(71) Applicant: Samsung Display Co., Ltd., Yongin (KR)

(72) Inventors: Kwang Keun Lee, Osan-si (KR); Jung Hyun Kwon, Seoul (KR); Young Min Kim, Yongin-si (KR); Min Ki Nam, Anseong-si (KR); Hae Il Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 203 days.

(21) Appl. No.: 14/695,765

(22) Filed: Apr. 24, 2015

(65) Prior Publication Data

US 2016/0133209 A1    May 12, 2016

(30) Foreign Application Priority Data

Nov. 11, 2014   (KR) .................. 10-2014-0156413

(51) Int. Cl.
*G09G 3/36*   (2006.01)
*G02F 1/1335*   (2006.01)

(52) U.S. Cl.
CPC ......... *G09G 3/36* (2013.01); *G02F 1/133617* (2013.01); *G02F 2201/086* (2013.01);
(Continued)

(58) Field of Classification Search
CPC ....... G09G 2310/06; G09G 2320/0252; G09G 2320/0204; G09G 2320/0219; G09G 2320/0223; G09G 2310/0237
See application file for complete search history.

(56) References Cited

U.S. PATENT DOCUMENTS

| 7,750,984 B2 | 7/2010 | Ha et al. |
| 8,277,064 B2 | 10/2012 | Willemsen et al. |

(Continued)

FOREIGN PATENT DOCUMENTS

| JP | 2013-235141 | 11/2013 |
| KR | 10-2010-0041122 | 4/2010 |
| KR | 10-1243819 | 3/2013 |

OTHER PUBLICATIONS

G.J.Heo et al. "Color PH-LCD Using STN Mode" IDW'98, Dec. 7, 1998, p. 221-224.
(Continued)

*Primary Examiner* — Shaheda Abdin
(74) *Attorney, Agent, or Firm* — H.C. Park & Associates, PLC

(57) ABSTRACT

A liquid crystal display including: a liquid crystal display including: a first polarizer, a second polarizer, a gate line, a data line, a thin film transistor, a pixel electrode, a first light blocking member, a second light blocking member, a liquid crystal layer, and a common electrode; a color conversion panel including a third light blocking member and a color conversion media layer, the color conversion panel being disposed on the liquid crystal panel; and a backlight assembly configured to supply light to the liquid crystal panel and the color conversion panel, wherein the first light blocking member overlaps the data line, wherein the second light blocking member is disposed between the first light blocking member and the third light blocking member, the third light blocking member overlapping the first light blocking member, and wherein the third light blocking member overlaps the second light blocking member.

20 Claims, 8 Drawing Sheets

(52) U.S. Cl.
CPC ...... *G02F 2201/40* (2013.01); *G02F 2202/36* (2013.01); *G09G 2300/0426* (2013.01)

(56) References Cited

U.S. PATENT DOCUMENTS

| | | | | |
|---|---|---|---|---|
| 2006/0274226 | A1* | 12/2006 | Im ........................ | B82Y 10/00 349/71 |
| 2009/0225017 | A1* | 9/2009 | Kim .................. | G02F 1/133514 345/88 |
| 2010/0134732 | A1* | 6/2010 | Cho .................. | G02F 1/136209 349/110 |
| 2012/0280968 | A1* | 11/2012 | Mishima .................. | G09G 3/36 345/212 |

OTHER PUBLICATIONS

Jeong Rok Oh et al. "Highly efficient full-color display based on blue LED backlight and electrochromic light valve coupled with front emitting phosphor" Optics Express vol. 19, No. 17, Aug. 5, 2011, p. 16022-16031.

Swie Lan Njo et al. "Light-Efficient Liquid Crystal Displays Using Photoluminescent" SID 00 Digest, May 1, 2000, p. 343-345.

\* cited by examiner

LIQUID CRYSTAL DISPLAY

CROSS-REFERENCE TO RELATED APPLICATION

This application claims priority from and the benefit of Korean Patent Application No. 10-2014-0156413, filed on Nov. 11, 2014, which is hereby incorporated by reference for all purposes as if fully set forth herein.

BACKGROUND

Field

Exemplary embodiments relate to a liquid crystal display.

Discussion of the Background

A liquid crystal display is generally formed of two display panels where electrodes are respectively disposed and a liquid crystal layer interposed between the two display panels, and applies a voltage to the electrodes to rearrange liquid crystal molecules of the liquid crystal layer to adjust an amount of transmitted light.

A liquid crystal display may have a structure in which an electric field generation electrode is provided in each of the two display panels. One of the two display panels may include a plurality of pixel electrodes and thin film transistors are arranged in a matrix format (hereinafter referred to as "a thin film transistor array panel"), and the other display panel may include color filters of red, green, and blue and one common electrode covering the entire surface of the other display panel (hereinafter referred to as "a common electrode panel").

However, such liquid crystal display may have light loss in the polarizers and the color filters. To reduce the light loss and increase the efficiency of the liquid crystal display, a photo-luminescent liquid crystal display (PL-LCD) has been proposed, which includes a color conversion material instead of the color filters.

The PL-LCD uses a color conversion media (CCM) instead of the color filters, and when light emitted from a light source is supplied to the color conversion media, a part of the light emitted from the light source may be diffused in an inclined direction and be supplied to adjacent pixels. Such a phenomenon is called optical crosstalk, which causes deterioration of color reproducibility.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display having improved color reproducibility.

Additional aspects will be set forth in the detailed description which follows, and, in part, will be apparent from the disclosure, or may be learned by practice of the inventive concept.

According to one or more exemplary embodiments, a liquid crystal display includes: a liquid crystal display including: a first polarizer, a second polarizer, a gate line, a data line, a thin film transistor, a pixel electrode, a first light blocking member, a second light blocking member, a liquid crystal layer, and a common electrode; a color conversion panel including a third light blocking member and a color conversion media layer, the color conversion panel being disposed on the liquid crystal panel; and a backlight assembly configured to supply light to the liquid crystal panel and the color conversion panel, wherein the first light blocking member overlaps the data line, wherein the second light blocking member is disposed between the first light blocking member and the third light blocking member, the third light blocking member overlapping the first light blocking member, and wherein the third light blocking member overlaps the second light blocking member.

According to one or more exemplary embodiments, a display apparatus, includes: a lighting assembly; a display panel disposed on the lighting assembly, the display panel including: a data line connected to a thin film transistor; a first light blocking member disposed on the data line; and a second light blocking member disposed on the first light blocking member; a color conversion panel disposed on the display panel, the color conversion panel including: a third light blocking member disposed on the second light blocking member, the second light blocking member being disposed between the first light blocking member and the third light blocking member; and a color conversion media layer; and a controllable layer disposed between the display panel and the color conversion panel, the controllable layer being configured to selectively transmit light from the display panel to the color conversion panel, wherein the lighting assembly is configured to supply light to the display panel.

The above information disclosed in this Background section is only for enhancement of understanding of the background of the inventive concept and therefore it may contain information that does not form any part of the prior art nor what the prior art may suggest to a person of ordinary skill in the art.

BRIEF DESCRIPTION OF THE DRAWINGS

The accompanying drawings, which are included to provide a further understanding of the inventive concept and are incorporated in and constitute a part of this specification, illustrate embodiments of the inventive concept, and together with the description serve to explain the principles of the inventive concept.

DETAILED DESCRIPTION OF THE ILLUSTRATED EMBODIMENTS

Figure 1:
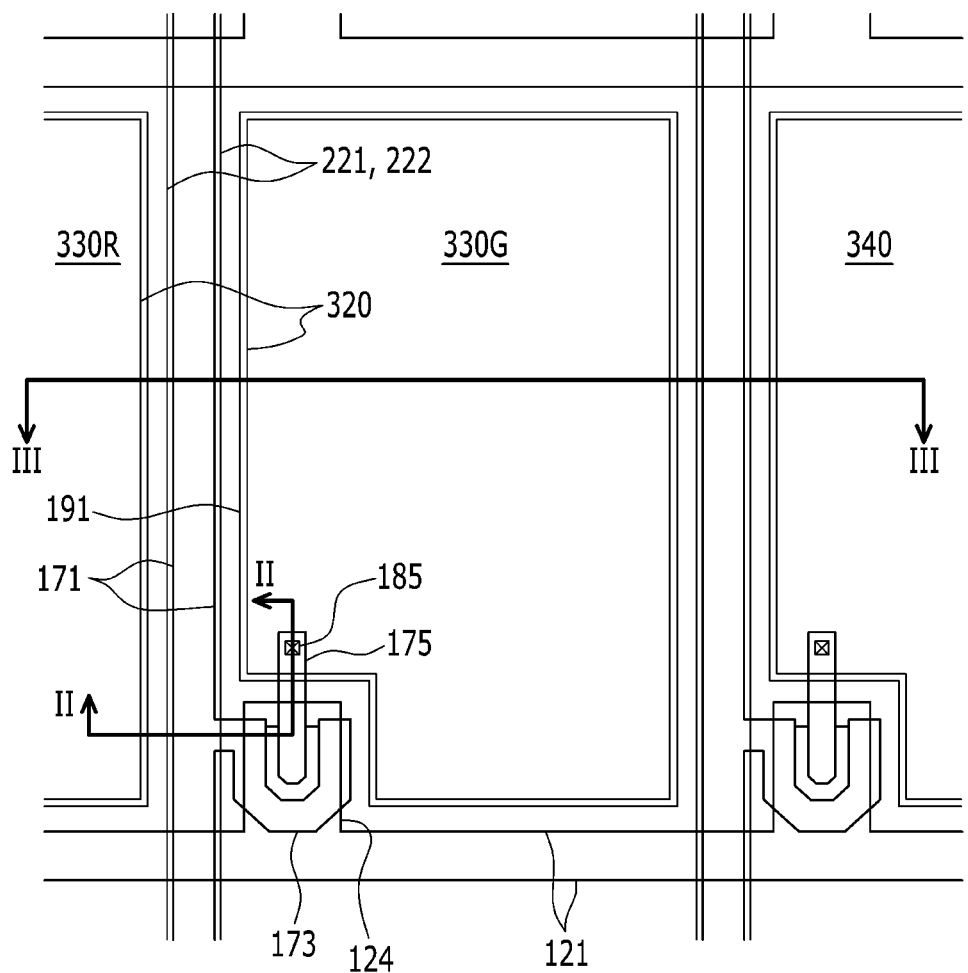
FIG. 1 is a layout view of a liquid crystal display according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising, " "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A liquid crystal display according to an exemplary embodiment will be described with reference to FIGS. 1, 2, and 3.

Figure 2:
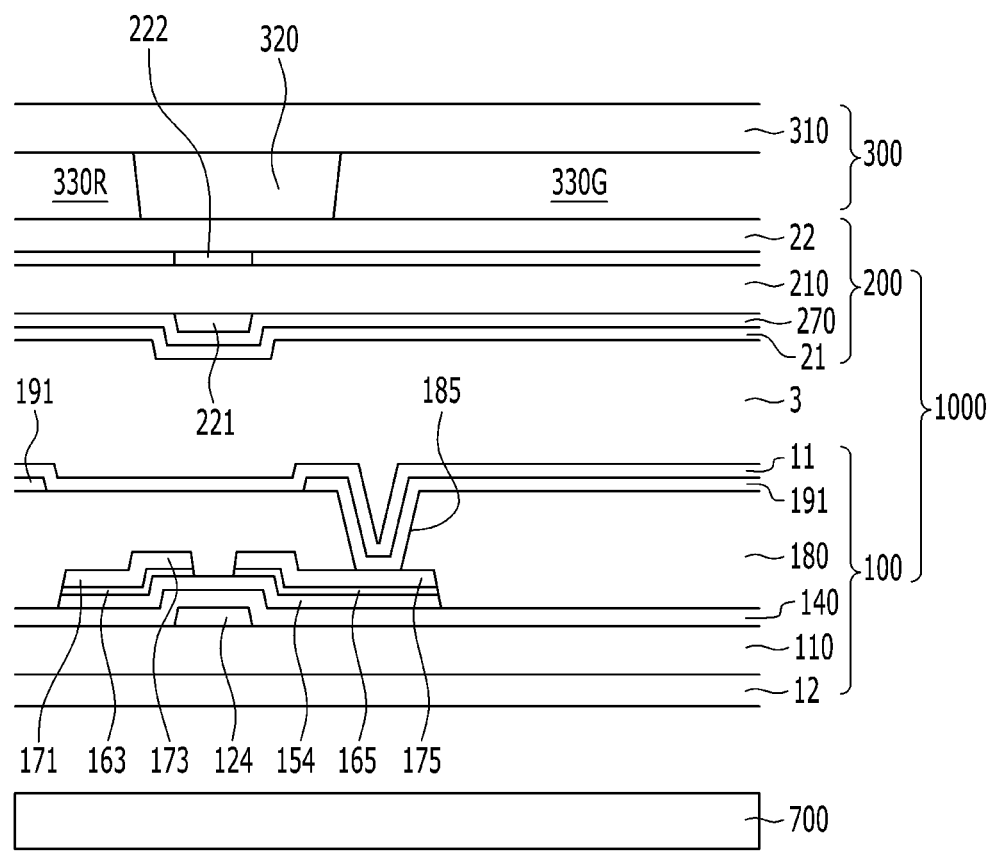
FIG. 2 is a cross-sectional view of the liquid crystal display of FIG. 1, taken along sectional line II-II, according to one or more exemplary embodiments.
Figure 3:
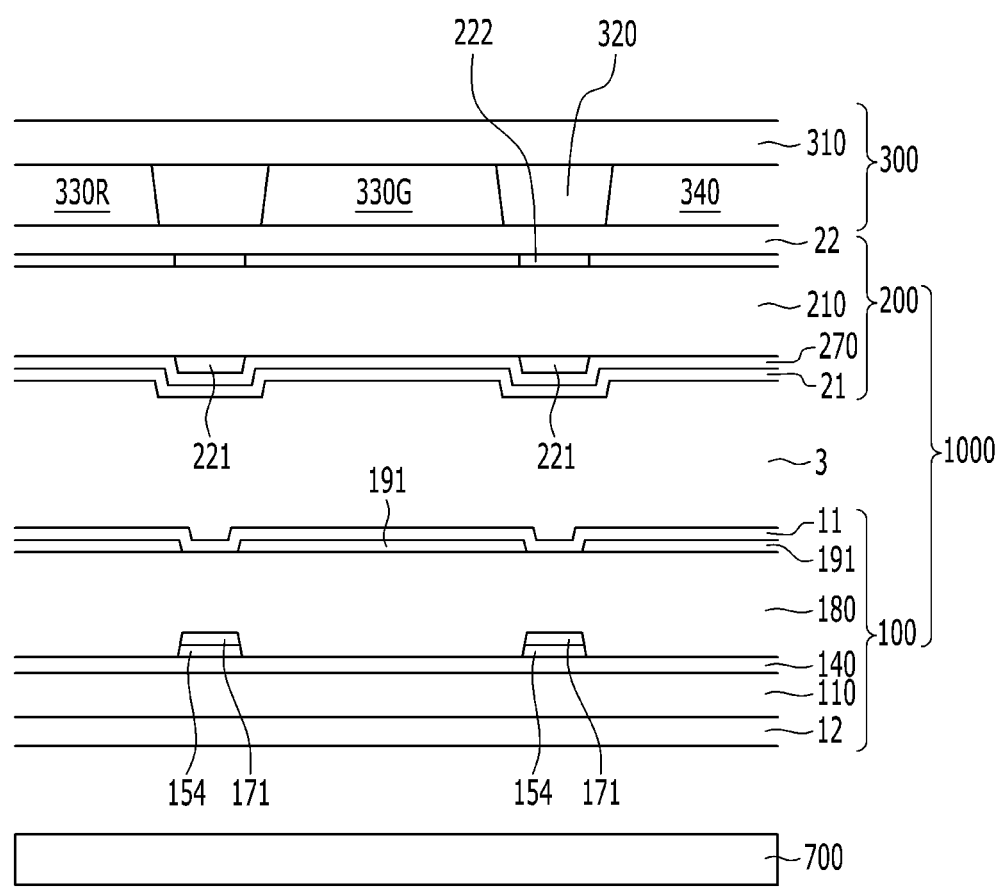
FIG. 3 is a cross-sectional view of the liquid crystal display of FIG. 1, taken along sectional line III-III, according to one or more exemplary embodiments.

FIG. 1 is a layout view of a liquid crystal display according to one or more exemplary embodiments, FIG. 2 is a cross-sectional view of the liquid crystal display of FIG. 1 taken along sectional line II-II, according to one or more exemplary embodiments, and FIG. 3 is a cross-sectional view of the liquid crystal display of FIG. 1 taken along sectional line III-III, according to one or more exemplary embodiments.

Referring to FIGS. 1, 2, and 3, a liquid crystal display according to the exemplary embodiments includes a liquid crystal panel 1000 and a color conversion panel 300. The liquid crystal panel 1000 includes a first display panel 100, a second display panel 200 disposed facing the first display panel 100, and a liquid crystal layer 3 provided between the first and second display panels 100 and 200. The color conversion panel 300 is disposed above the second display panel 200.

The liquid crystal display according to the present exemplary embodiment may further include a backlight assembly 700 configured to supply light to the liquid crystal panel 1000 and the color conversion panel 300. The backlight assembly 700 is configured to supply blue light, and may include a blue light emitting diode (LED).

First, the liquid crystal panel 1000 will be described. The first display panel 100 includes a first substrate 110, a plurality of gate lines 121, a plurality of semiconductors 154, a plurality of ohmic contacts 163 and 165, a plurality of data lines 171, and a plurality of drain electrodes 175, a passivation layer 180, a pixel electrode 191, a first alignment layer 11, and a first polarizer 12.

The plurality of gate lines 121 is disposed on the first substrate 110, wherein the first substrate 110 may be formed of, but not limited to, transparent glass or plastic. A gate insulating layer 140, the plurality of semiconductors 154, the plurality of ohmic contacts 163 and 165, the plurality of data lines 171, and the plurality of drain electrodes 175 are sequentially disposed on the gate line 121.

The gate line 121 is substantially extended in a horizontal direction and configured to transmit a gate signal. The gate line 121 includes a plurality of gate electrodes 124 protruding substantially in a vertical direction.

The data line 171 is configured to transmit a data signal, and extends substantially in a vertical direction, crossing the gate line 121. Each data line 171 includes a plurality of source electrodes 173 extending toward the gate electrode 124. The drain electrode 175 is disposed separated from the data line 171 facing the source electrode 173 with respect to the gate electrode 124.

The semiconductor 154 is disposed above the gate electrode 124, and the ohmic contacts 163 and 165 are disposed between the semiconductor 154 and the data line 171, and the semiconductor 154 and the drain electrode 175, respectively, to reduce contact resistance therebetween.

One gate electrode 124, one source electrode 173, one drain electrode 175, and one semiconductor 154 form a thin film transistor (TFT), and a channel of the TFT is formed in the semiconductor 154 between the source electrode 173 and the drain electrode 175.

The passivation layer 180 is provided on the gate insulating layer 140, the data line 171, and the drain electrode 175. A contact hole 185 exposing the drain electrode 175 is provided in the passivation layer 180.

The pixel electrode 191 is provided on the passivation layer 180. The pixel electrode 191 may be formed of a transparent conductive material such as indium tin oxide (ITO) and indium zinc oxide (IZO), and/or a reflective material such as aluminum or a silver alloy, and contacts the drain electrode through the contact hole 185.

The first alignment layer 11, configured to align molecules of liquid crystal, is disposed on the pixel electrode 191, and the first polarizer 12 is disposed on a bottom surface of the first substrate 110.

The second display panel 200 includes a second substrate 210, a plurality of first light blocking members 221, a plurality of second light blocking members 222, a common electrode 270, a second alignment layer 21, and a second polarizer 22.

The plurality of first light blocking members 221 are provided on a first surface of the second substrate 210 that is formed of transparent glass or plastic, and the common electrode 270 is provided covering the first light blocking member 221 and the first surface of the second substrate 210. Here, the common electrode 270 faces the pixel electrode 191 of the first substrate 110, interposing the liquid crystal layer 3 therebetween. The common electrode 270 is configured to receive a common voltage, and a data voltage is applied to the pixel electrode 191 to generate an electric field and determine a direction of the liquid crystal molecules of the liquid crystal layer 3. In addition, each of the first light blocking members 221 overlaps each of the data lines 171.

The plurality of second light blocking members 222 are disposed on a second surface of the second substrate 210, which is the opposite side of the first surface of the second substrate 210. Each of the second light blocking members 222 overlaps each of the first light blocking members 221.

Next, the color conversion panel 300 will be described.

The color conversion panel 300 includes a color conversion substrate 310, a plurality of third light blocking members 320, a plurality of red color conversion media layers 330R, a plurality of green color conversion media layers 330G, and a plurality of transparent layers 340.

The third light blocking member 320, the red color conversion media layer 330R, the green color conversion media layer 330G, and the transparent layer 340 are disposed on a first substrate of the color conversion substrate 310 that is formed of transparent glass or plastic.

The third light blocking member 320, the red color conversion media layer 330R, the green color conversion media layer 330G, and the transparent layer 340 contact the second polarizer 22.

Each of the third light blocking members 320 overlaps each of the second light blocking members 222. Each of the third light blocking members 320 partitions an area where the red color conversion media layer 330R, the green color conversion media layer 330G, and the transparent layer 340 are disposed, and the red color conversion media layer 330R, the green color conversion media layer 330G, and the transparent layer 340 are disposed between the third light blocking members 320.

The red color conversion media layer 330R converts blue light supplied from the backlight assembly 700 to red light. The red color conversion media layer 330R may be formed of a red phosphor, and at least one of (Ca, Sr, Ba)S, (Ca, Sr, Ba)$_2$Si$_5$N$_8$, CaAlSiN$_3$, CaMoO$_4$, and Eu$_2$Si$_5$N$_8$ may be used as the red phosphor.

The green color conversion media layer 330G converts blue light supplied from the backlight assembly 700 to green light. The green color conversion media layer 330G is formed of a green phosphor, and at least one of yttrium aluminum garnet (YAG), (Ca, Sr, Ba)$_2$SiO$_4$, SrGa$_2$S$_4$, BAM, $\alpha$-SiAlON, $\beta$-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$ may be used as the green phosphor.

The red color conversion media layer 330R and the green color conversion media layer 330G may be formed of quantum dots of which a color is changed according to the size.

The transparent layer 340 may formed of transparent polymer, and blue light supplied from the backlight assembly 700 is passed through the transparent layer 340 such that a blue color is displayed. The transparent layer 340 may include a plurality of pores that diffuse the blue light supplied from the backlight assembly 700.

Next, a light path of the liquid crystal display according to the exemplary embodiment will be described with reference to FIGS. 4, 5(a), and 5(b).

Figure 4:
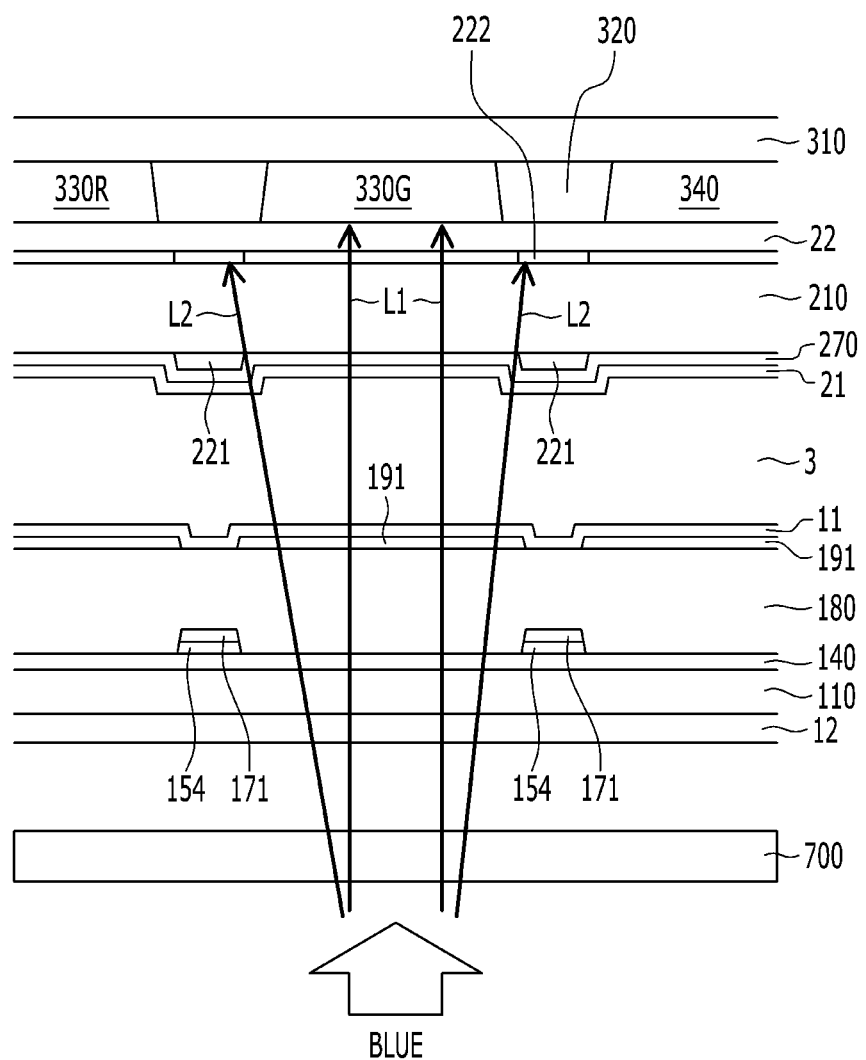
FIG. 4 shows a light path of the liquid crystal display according to one or more exemplary embodiments.

FIG. 4 shows a light path of the liquid crystal display according to one or more exemplary embodiments.

FIG. 4 illustrates only the green color conversion media layer 330G, but the light path may be equally applied to the red color conversion media layer 330R and the transparent layer 340.

Referring to FIG. 4, blue light emitted from the backlight assembly 700 is passed through the liquid crystal layer 3 and then supplied to the green color conversion media layer 330G.

In this case, a first light L1 is supplied to the green color conversion media layer 330G, and a second light L2 is diffused in an inclined direction and then supplied in a direction of the red color conversion media layer 330R and the transparent layer 340 that are adjacent to the green color conversion media layer 330G. However, the second light blocking member 222 may block the second light L2 from being supplied to the red color conversion media layer 330R and the transparent layer 340.

The second light L2 supplied to the red color conversion media layer 330R and the transparent layer 340 that are adjacent to the green color conversion media layer 330G may cause optical crosstalk. According to the present exemplary embodiments, the second light blocking member 222 is provided between the first light blocking member 221 and the third light blocking member 320 to block the second light L2 that causes the optical crosstalk, thereby improving color reproducibility. Accordingly, a display characteristic of the liquid crystal display can be improved.

An aperture ratio of the liquid crystal display may be maintained and accordingly, transmittance of the liquid crystal display may not be decreased regardless of the addition of the second light blocking member 222, because the second light blocking member 222 is disposed between the first light blocking member 221 and the third light blocking member 320, overlapping with the first light blocking member 221 and the third light blocking member 320.

Figure 5A:
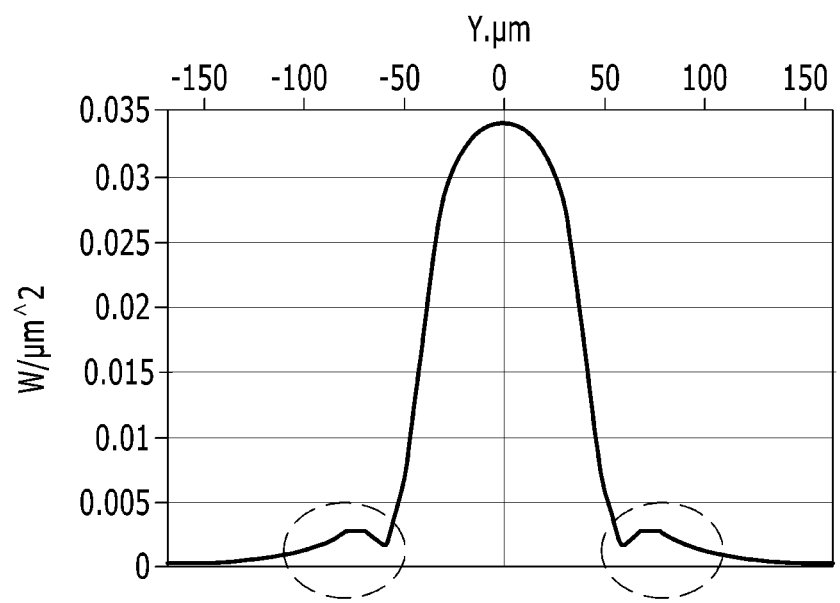
FIG. 5(*a*) shows a light simulation result of a structure in which the second light blocking member is not provided, and FIG. 5(*b*) shows a light simulation result of a structure in which the second light blocking member is provided between the first light blocking member and the third light blocking member according to one or more exemplary embodiments
Figure 5B:
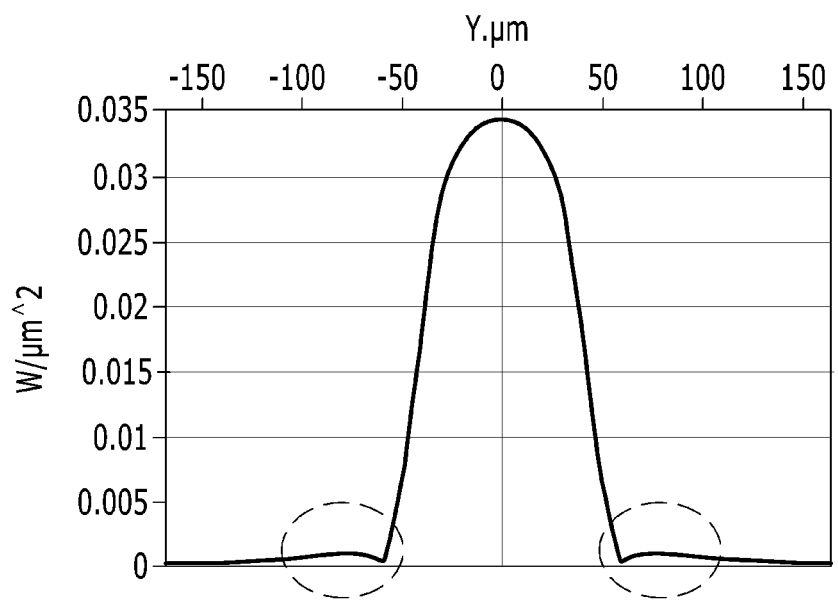

FIG. 5(a) shows a light simulation result of a structure in which the second light blocking member 222 is not provided, and FIG. 5(b) shows a light simulation result of a structure in which the second light blocking member 222 is provided between the first light blocking member 221 and the third light blocking member 320, according to one or more exemplary embodiments.

Referring to FIG. 5(a), the simulation result illustrates that the second light L2 diffused in the inclined direction is supplied to the red color conversion media layer 330R and the transparent layer 340 that are adjacent to the green color conversion media layer 330G.

Referring to FIG. 5(b), the simulation result illustrates that the second light L2 diffused in the inclined direction is blocked by the second light blocking member 222.

Hereinafter, a liquid crystal display according to exemplary embodiments will be described with reference to FIG. 6.

Figure 6:
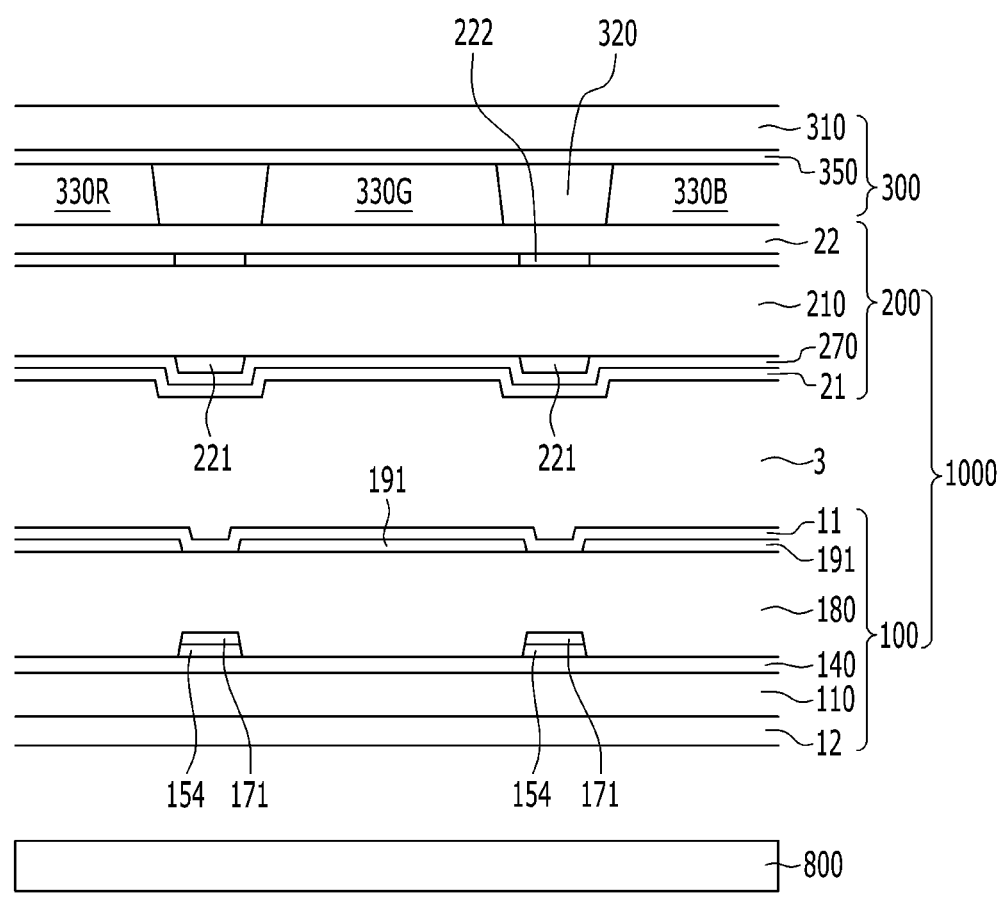
FIG. 6 is a cross-sectional view of a liquid crystal display, according to one or more exemplary embodiments.

FIG. 6 is a cross-sectional view of a liquid crystal display according to one or more exemplary embodiments.

Referring to FIG. 6, a liquid crystal display according to the exemplary embodiments is the same as the liquid crystal display of FIG. 1, except for a structure of a backlight assembly and a color conversion panel. Thus, a description of the same components as the liquid crystal display of FIG. 1 will not be provided.

A backlight assembly 800 is configured to supply ultraviolet rays to a liquid crystal panel 1000 and a color conversion panel 300, and may include an ultraviolet ray light emitting diode (LED).

The color conversion panel 300 includes a color conversion substrate 310, a plurality of third light blocking members 320, a plurality of red color conversion media layers 330R, a plurality of green color conversion media layers 330G, a plurality of blue color conversion media layer 330B, and an ultraviolet ray blocking filter 350.

The ultraviolet ray blocking filter 350 is disposed on a first surface of the color conversion substrate 310 that is formed of transparent glass or plastic. The third light blocking member 320, the red color conversion media layer 330R, the green color conversion media layer 330G, and a blue color conversion media layer 330B are disposed below the ultraviolet ray blocking filter 350.

The third light blocking member 320, the red color conversion media layer 330R, the green color conversion media layer 330G, and the blue color conversion media layer 330B are disposed directly contacting the second polarizer 22.

Each of the third light blocking members 320 overlaps each of the second light blocking members 222. Each of the third light blocking members 320 partitions an area where the red color conversion media layer 330R, the green color conversion media layer 330G, and the blue color conversion media layer 330B are disposed, and the red color conversion media layer 330R, the green color conversion media layer 330G, and the blue color conversion media layer 330B are disposed between the third light blocking members 320.

The red color conversion media layer 330R may be formed of a red phosphor, and at least one of $Y_2O_2S$, $La_2O_2S$, $(Ca, Sr, Ba)_2Si_5N_8$, $CaAlSiN_3$, $(La, Eu)_2W_3O_{12}$, $(Ca, Sr, Ba)_3MgSi_2O_8$, and $Li(Eu, Sm)W_2O_8$ may be used as the red phosphor. The red phosphor receives ultraviolet rays, emits red light, and diffuses the red light.

The green color conversion media layer 330G is formed of a green phosphor, and at least one of $(Ca, Sr, Ba)_2SiO_4$, BAM, $\alpha$-SiAlON, $Ca_3Sc_2Si_3O_{12}$, $Tb_3Al_5O_{12}$, and $LiTbW_2O_8$ may be used as the green phosphor. The green phosphor receives ultraviolet rays, emits green light, and diffuses the green light.

The blue color conversion media layer 330B is formed of a blue phosphor, and at least one of $BaMgAl_{10}O_{17}$, $(Mg, Ca, Sr, Ba)_5PO_{43}Cl$, $EuSi_9Al_{19}ON_{31}$, and $La_{1-x}Ce_xAl\,(Si_{6-z}Al_z)(N_{10-z}O_z)$ may be used as the blue phosphor. The blue phosphor receives ultraviolet rays, emits blue light, and diffuses the blue light.

The red color conversion media layer 330R, the green color conversion media layer 330G, and the blue color conversion media layer 330B may be formed of quantum dots of which a color is changed according to the size.

The ultraviolet ray blocking filter 350 configured to block ultraviolet rays is provided between the color conversion substrate 310 and the red color conversion media layer 330R, the green color conversion media layer 330G, and the blue color conversion media layer 330B. The red color conversion media layer 330R, the green color conversion media layer 330G, and the blue color conversion media layer 330B receive ultraviolet rays and respectively emit blue light, green light, and blue light, but the ultraviolet rays may partially be supplied to the outside. The ultraviolet ray blocking filter 350 is configured to block the partial ultraviolet ray emitting to the outside through the red color conversion media layer 330R, the green color conversion media layer 330G, and blue color conversion media layer 330B.

The ultraviolet ray blocking filter 350 may be formed of a mixture of one of $BiO_2$, ZnO, and $Ce_2O_3$ and one of $CaCO_3$, $ZrO_2$, TiO, and $Ar_2O_3$.

In addition, the ultraviolet ray blocking filter 350 may be disposed on a second surface of the color conversion filter 310, which is the opposite side of the first surface of the color conversion substrate 310.

Hereinafter, a liquid crystal display according to another exemplary embodiment will be described with reference to FIG. 7.

Figure 7:
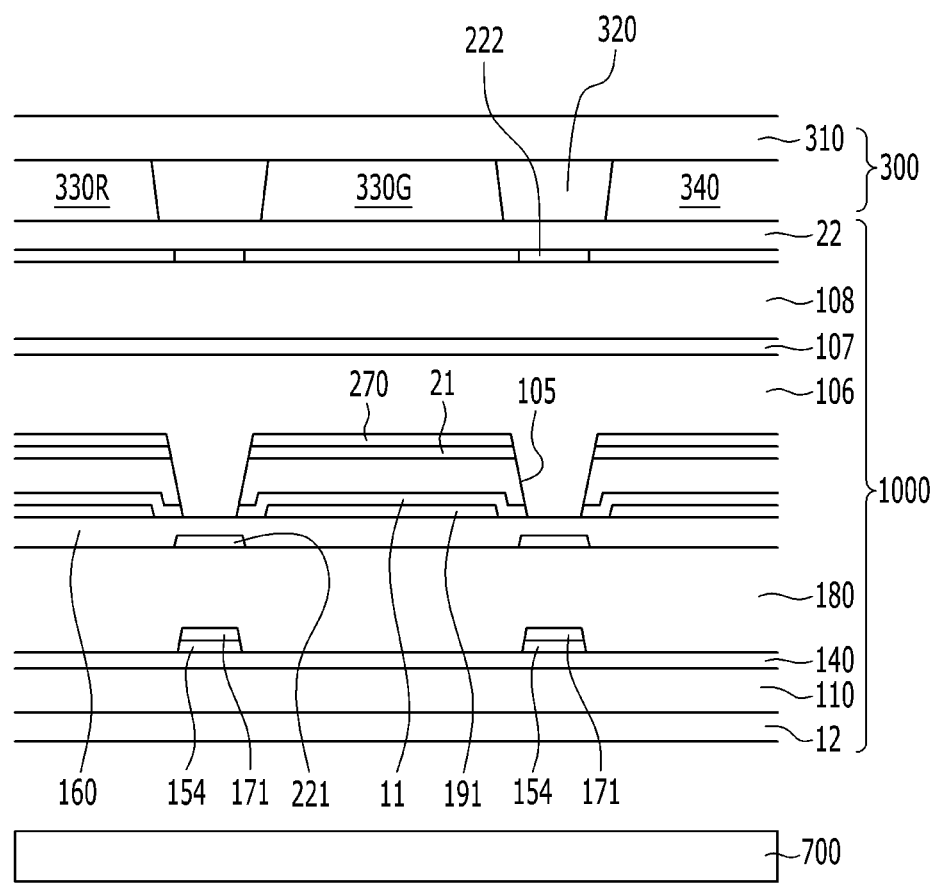
FIG. 7 is a cross-sectional view of a liquid crystal display, according to one or more exemplary embodiments.

FIG. 7 is a cross-sectional view of a liquid crystal display according to one or more exemplary embodiments.

Referring to FIG. 7, the liquid crystal display of FIG. 7 is the same as the liquid crystal display of FIG. 1, except for a structure of a liquid crystal panel 1000. Thus, the same components of the liquid crystal display of FIG. 1 will not be described.

Referring to FIGS. 2 and 7, the liquid crystal panel 1000 includes a first substrate 110, a plurality of gate lines 121, a plurality of semiconductors 154, a plurality of ohmic contacts 163 and 165, a plurality of data lines 171, a plurality of drain electrodes 175, and a passivation layer 180. Such a structure is the same as that of the liquid crystal display of FIG. 1. Thus, the structure will not be described in the present exemplary embodiment.

A plurality of first light blocking members 221 and an interlayer insulating layer 160 are disposed on the passivation layer 180. Each of the first light blocking members 221 overlaps each data line 171. The interlayer insulating layer 160 covers the first light blocking member 221, and the interlayer insulating layer 160 may have a flat upper surface.

A pixel electrode 191 is disposed on the interlayer insulating layer 160, a first alignment layer 11 is disposed on the pixel electrode 191, a second alignment layer 21 is provided in a portion that faces the first alignment layer 11, and a microcavity 105 is provided between the first alignment layer 11 and the second alignment layer 21.

A liquid crystal material including liquid crystal molecules is injected to the microcavity 105, and the microcavity 105 includes a liquid crystal injection hole (not shown) to which the liquid crystal material is injected. The liquid crystal injection hole (not shown) may be provided in a side surface of the microcavity 105.

A common electrode 270 is disposed on the second alignment layer 21. The common electrode 270 is configured to receive a common voltage, and a data voltage is applied to the pixel electrode 191 to generate an electric field and determine a direction of the liquid crystal molecules in the microcavity 105. The common electrode 270 forms a capacitor with the pixel electrode 191 and maintains a voltage applied thereto after a thin film transistor is turned off.

The common electrode 270 is disposed on the cavity 105 in the present exemplary embodiment, but the common electrode 270 may be disposed below the microcavity 105, and the liquid crystal display may be driven in a coplanar electrode (CE) mode.

A roof layer 106 is disposed on the common electrode 270. The roof layer 106 supports formation of the microcavity 105, which is a space between the pixel electrode 191 and the common electrode 270. The roof layer 106 may include a photoresist or other organic materials.

An insulating layer 107 formed of a silicon nitride (SiNx) or a silicon oxide (SiOx) is disposed on the roof layer 106, and a capping layer 108 is disposed on the insulating layer 107.

The capping layer 108 covers a liquid crystal injection hole (not shown) of the exposed microcavity 105 formed while filling a portion where the liquid crystal injection hole (not shown) is formed. The capping layer 108 includes an organic material or an inorganic material.

A plurality of second light blocking members 222 is disposed on the capping layer 108. Each of the second light blocking members 222 overlaps each of the first light blocking members 221. A second polarizer 22 is disposed on the second light blocking member 222 and the capping layer 108.

Figure 8:
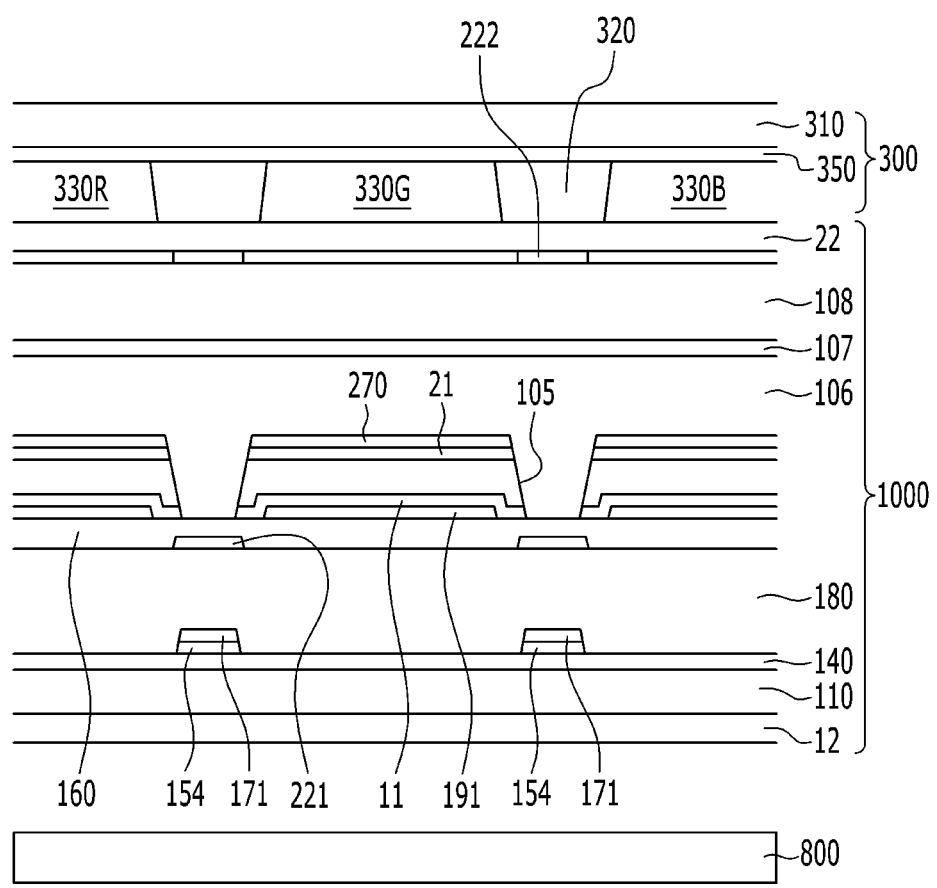
FIG. 8 is a cross-sectional view of a liquid crystal display, according to one or more exemplary embodiments.

FIG. 8 is a cross-sectional view of a liquid crystal display according to one or more exemplary embodiments.

The liquid crystal display of FIG. 8 is the same as the liquid crystal display of FIG. 7, except for a structure of a backlight assembly and a color conversion panel. Thus, components that are the same as in the liquid crystal display of FIG. 7 will not be described.

A backlight assembly 800 is configure to supply ultraviolet rays to a liquid crystal panel 1000 and a color conversion panel 300, and may include an ultraviolet ray light emitting diode (LED) that generates ultraviolet rays.

The color conversion panel 300 includes a color conversion substrate 310, a plurality of third light blocking members 320, a plurality of red color conversion media layers 330R, a plurality of green color conversion media layers 330G, a plurality of blue color conversion media layers 330B, and an ultraviolet ray blocking filter 350.

The ultraviolet ray blocking filter 350 is disposed on a first surface of a second substrate 210 that is formed of transparent glass or plastic. The third light blocking member 320, the red color conversion media layer 330R, the green color conversion media layer 330G, and the blue color conversion media layer 330B are disposed below the ultraviolet ray blocking filter 350.

The third light blocking member 320, the red color conversion media layer 330R, the green color conversion media layer 330G, and the blue color conversion media layer 330B are disposed directly contacting a second polarizer 22.

Each of the third light blocking members 320 overlaps each of the second light blocking members 222. Each of the third light blocking member 320 partitions an area where the red color conversion media layer 330R, the green color conversion media layer 330G, and the blue color conversion media layer 330B are disposed, and the red color conversion media layer 330R, the green color conversion media layer 330, and the blue color conversion media layer 330B are disposed between the third light blocking members 320.

The red color conversion media layer 330R is formed of a red phosphor, and at least one of $Y_2O_2S$, $La_2O_2S$, $(Ca, Sr, Ba)_2Si_5N_8$, $CaAlSiN_3$, $(La, Eu)_2W_3O_{12}$, $(Ca, Sr, Ba)_3MgSi_2O_8$, and $Li(Eu, Sm)W_2O_8$ may be used as the red phosphor. The red phosphor receives ultraviolet rays, emits red light, and diffuses the red light.

The green color conversion media layer 330G is formed of a green phosphor, and at least one of $(Ca, Sr, Ba)_2SiO_4$, BAM, α-SiAlON, $Ca_3Sc_2Si_3O_{12}$, $Tb_3Al_5O_{12}$, and $LiTbW_2O_8$ may be used as the green phosphor. The green phosphor receives ultraviolet rays, emits green light, and diffuses the green light.

The blue color conversion media layer 330B is formed of a blue phosphor, and at least one of $BaMgAl_{10}O_{17}$, $(Mg, Ca, Sr, Ba)_5PO_{43}Cl$, $EuSi_9Al_{19}ON_{31}$, and $La_{1-x}Ce_xAl\ (Si_{6-z}Al_z)(N_{10-z}O_z)$ may be used as the blue phosphor. The blue phosphor receives ultraviolet rays, emits blue light, and diffuses the blue light.

The red color conversion media layer 330R, the green color conversion media layer 330G, and the blue color conversion media layer 330B may be formed of quantum dots of which a color is changed according to the size.

The ultraviolet ray blocking filter 350 configured to block ultraviolet rays is provided between the color conversion substrate 310, and the red color conversion media layer 330R, the green color conversion media layer 330G, and the blue color conversion media layer 330B. The red color conversion media layer 330R, the green color conversion media layer 330G, and the blue color conversion media layer 330B receive ultraviolet rays and respectively emit blue light, green light, and blue light, but the ultraviolet rays may partially be supplied to the outside. The ultraviolet ray blocking filter 350 is configured to block the partial ultraviolet ray emitting to the outside through the red color conversion media layer 330R, the green color conversion media layer 330G, and blue color conversion media layer 330B.

The ultraviolet ray blocking filter 350 may be formed of a mixture of one of $BiO_2$, ZnO, and $Ce_2O_3$ and one of $CaCO_3$, $ZrO_2$, TiO, and $Ar_2O_3$.

In addition, the ultraviolet ray blocking filter 350 may be disposed in a second surface of the color conversion filter 310, which is the opposite side of the first surface of the color conversion substrate 310.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
    a liquid crystal panel comprising a first polarizer, a second polarizer, a gate line, a data line, a thin film transistor, a pixel electrode, a first light blocking member, a second light blocking member, a liquid crystal layer, and a common electrode;
    a color conversion panel comprising a third light blocking member and a color conversion media layer, the color conversion panel being disposed on the liquid crystal panel; and
    a backlight assembly configured to supply light to the liquid crystal panel and the color conversion panel,
    wherein the first light blocking member overlaps the data line,
    wherein the second light blocking member is disposed between the first light blocking member and the third light blocking member, the third light blocking member overlapping the first light blocking member, and
    wherein the third light blocking member overlaps the second light blocking member.

2. The liquid crystal display of claim 1, wherein:
    the backlight assembly comprises a blue light emitting diode configured to emit blue light;
    the color conversion panel further comprises a color conversion substrate, the third light blocking member and the color conversion media layer being disposed on the color conversion substrate; and
    the color conversion media layer comprises a red color conversion media layer, a green color conversion media layer, and a transparent layer.

3. The liquid crystal display of claim 2, wherein:
    the liquid crystal panel further comprises:
        a first substrate, the first polarizer, the gate line, the data line, the thin film transistor, and the pixel electrode being disposed on the first substrate; and
        a second substrate, the second polarizer, the first light blocking member, the second light blocking member, and the common electrode being disposed on the second substrate;
    the pixel electrode and the common electrode face each other; and
    the liquid crystal layer is disposed between the pixel electrode and the common electrode.

4. The liquid crystal display of claim 3, wherein:
    the gate line and the data line are disposed on a first surface of the first substrate;
    the thin film transistor is connected with the gate line and the data line;
    the pixel electrode is connected to the thin film transistor; and
    the polarizer is provided on a second surface of the first substrate, the second surface opposing the first surface.

5. The liquid crystal display of claim 4, wherein:
    the first light blocking member is disposed on a first surface of the second substrate; and
    the common electrode covers the first light blocking member, the common electrode being disposed on the first surface of the second substrate.

6. The liquid crystal display of claim 5, wherein:
    the second light blocking member is disposed on a second surface of the second substrate, the second surface opposing the first surface of the second substrate;
    the second polarizer is disposed on the second light blocking member; and
    the second polarizer contacts the third light blocking member, the color conversion media layer, and the transparent layer.

7. The liquid crystal display of claim 2, wherein the liquid crystal panel further comprises a first substrate, the first polarizer, the second polarizer, the gate line, the data line, the thin film transistor, the pixel electrode, the first light blocking member, the second light blocking member, the liquid crystal layer, and the common electrode being disposed on the first substrate.

8. The liquid crystal display of claim 7, wherein:
    the first polarizer is disposed on a first surface of the first substrate;
    the gate line and the data line are disposed on a second surface of the first substrate;
    the thin film transistor is connected to the gate line and the data line;
    the liquid crystal panel further comprises a passivation layer disposed on the thin film transistor; and
    the first light blocking member is disposed on the passivation layer.

9. The liquid crystal display of claim 8, wherein:
    the pixel electrode is connected to the thin film transistor;
    the common electrode faces the pixel electrode;
    the liquid crystal panel further comprises a microcavity disposed between the pixel electrode and the common electrode; and
    the liquid crystal layer is disposed in the microcavity.

10. The liquid crystal display of claim 9, wherein:
    the liquid crystal panel further comprises a roof layer covering the microcavity and a capping layer disposed on the microcavity,
    the second light blocking member is disposed on the capping layer;
    the second polarizer is disposed on the second light blocking member; and
    the second polarizer contacts the third light blocking member, the color conversion media layer, and the transparent layer.

11. The liquid crystal display of claim 1, wherein:
    the backlight assembly comprises an ultraviolet ray light emitting diode configured to emit ultraviolet rays,
    the color conversion panel further comprises:
        a color conversion substrate, the third light blocking member and the color conversion media layer being disposed on the color conversion substrate; and
        an ultraviolet ray blocking filter disposed between the color conversion substrate and the third light blocking member and the color conversion media layer; and
    the color conversion media layer comprises a red color conversion media layer, a green color conversion media layer, and a blue color conversion media layer.

12. The liquid crystal display of claim 11, wherein:
    the liquid crystal panel further comprises:
        a first substrate, the first polarizer, the gate line, the data line, the thin film transistor, and the pixel electrode being disposed on the first substrate; and a second substrate, the second polarizer, the first light blocking member, the second light blocking member, and the common electrode being disposed on the second substrate;

the pixel electrode and the common electrode face each other; and the liquid crystal layer is disposed between the pixel electrode and the common electrode.

13. The liquid crystal display of claim 12, wherein:
the gate line and the data line are disposed on a first surface of the first substrate;
the thin film transistor is connected to the gate line and the data line;
the pixel electrode is connected to the thin film transistor; and
the first polarizer is disposed on a second surface of the first substrate, the second surface opposing the first surface.

14. The liquid crystal display of claim 13, wherein:
the first light blocking member is disposed on a first surface of the second substrate; and
the common electrode covers the first light blocking member, the common electrode being disposed on the first surface of the second substrate.

15. The liquid crystal display of claim 14, wherein:
the second light blocking member is disposed on a second surface of the second substrate, the second surface opposing the first surface of the second substrate;
the second polarizer is disposed on the second light blocking member; and
the second polarizer contacts the third light blocking member, the color conversion media layer, and the transparent layer.

16. The liquid crystal display of claim 11, wherein the liquid crystal panel further comprises a first substrate, the first polarizer, the second polarizer, the gate line, the data line, the thin film transistor, the pixel electrode, the first light blocking member, the second light blocking member, the liquid crystal layer, and the common electrode are disposed on the first substrate.

17. The liquid crystal display of claim 16, wherein:
the first polarizer is disposed on a first surface of the first substrate;
the gate line and the data line are disposed on a second surface of the first substrate;
the thin film transistor is connected to the gate line and the data line;
the liquid crystal panel further comprises a passivation layer disposed on the thin film transistor; and
the first light blocking member is disposed on the passivation layer.

18. The liquid crystal display of claim 17, wherein:
the pixel electrode is connected to the thin film transistor;
the common electrode faces the pixel electrode;
the liquid crystal panel further comprises a microcavity disposed between the pixel electrode and the common electrode; and
the liquid crystal layer is disposed in the microcavity.

19. The liquid crystal display of claim 18, wherein:
the liquid crystal panel further comprises a roof layer covering the microcavity and a capping layer;
the second light blocking member is disposed on the capping layer;
the second polarizer is disposed on the second light blocking member; and
the second polarizer contacts the third light blocking member, the color conversion media layer, and the transparent layer.

20. A display apparatus, comprising:
a lighting assembly;
a display panel disposed on the lighting assembly, the display panel comprising:
 a data line connected to a thin film transistor;
 a first light blocking member disposed on the data line; and
 a second light blocking member disposed on the first light blocking member;
a color conversion panel disposed on the display panel, the color conversion panel comprising:
 a third light blocking member disposed on the second light blocking member, the second light blocking member being disposed between the first light blocking member and the third light blocking member; and
 a color conversion media layer; and
a controllable layer disposed between the display panel and the color conversion panel, the controllable layer being configured to selectively transmit light from the display panel to the color conversion panel,
wherein the lighting assembly is configured to supply light to the display panel.

* * * * *